(12) United States Patent
Graf

(10) Patent No.: US 7,874,175 B2
(45) Date of Patent: Jan. 25, 2011

(54) HEAT ENGINE / HEAT PUMP USING CENTRIFUGAL FANS

(76) Inventor: Ronald Edward Graf, 450 N. Broad St. #302, Winston-Salem, NC (US) 27101

( * ) Notice: Subject to any disclaimer, the term of this patent is extended or adjusted under 35 U.S.C. 154(b) by 649 days.

(21) Appl. No.: 12/152,437

(22) Filed: May 15, 2008

(65) Prior Publication Data
US 2009/0282828 A1    Nov. 19, 2009

(51) Int. Cl.
*F25B 270/00* (2006.01)
(52) U.S. Cl. ........................................ 62/324.1; 62/402
(58) Field of Classification Search ................ 62/324.1, 62/160, 238.7, 87, 401, 402; 60/659, 516, 60/39.512, 693; 415/127; 165/8, 89, 90
See application file for complete search history.

(56) References Cited

U.S. PATENT DOCUMENTS

| | | | | |
|---|---|---|---|---|
| 5,473,899 A | * | 12/1995 | Viteri et al. | 60/684 |
| 5,709,103 A | * | 1/1998 | Williams | 62/402 |
| 5,713,210 A | * | 2/1998 | Jirnov et al. | 62/87 |
| 6,050,103 A | * | 4/2000 | Ko | 62/401 |
| 6,138,457 A | * | 10/2000 | Lackstrom et al. | 60/651 |
| 6,151,909 A | * | 11/2000 | Carter et al. | 62/402 |
| 6,164,084 A | * | 12/2000 | Watson et al. | 62/402 |
| 6,331,195 B1 | * | 12/2001 | Faust et al. | 55/396 |
| 6,381,969 B1 | * | 5/2002 | Afeiche et al. | 62/87 |
| 6,702,545 B2 | * | 3/2004 | Scholten | 415/1 |
| 2007/0101755 A1 | * | 5/2007 | Kikuchi et al. | 62/402 |
| 2008/0238222 A1 | * | 10/2008 | Andres | 310/52 |

* cited by examiner

*Primary Examiner*—Mohammad M Ali

(57) ABSTRACT

An engine/heat pump is shown. Most of its parts rotate around the same central axis. It comprises two doubly connected chambers. Blades in each chamber substantially rotate with the chamber and may be firmly attached to the walls of the chamber, thus forming a modified centrifugal pump with axial input and discharge. An expandable fluid is rotated outward by one of the pumps and then heat is added for an engine or removed for a heat pump as the fluid is being sent to the outer part of the second pump. The fluid travels toward the center of the second pump, thus impelling the pump in the rotation direction. Then heat is removed for an engine or added for a heat pump as the fluid leaves the second pump and travels back to the first pump near the center of rotation of both pumps. Rotation energy of the fluid is typically much larger than the circulation energy. A modified centrifugal pump with axial discharge having a casing rotating with the blades is also claimed.

2 Claims, 1 Drawing Sheet

HEAT ENGINE / HEAT PUMP USING CENTRIFUGAL FANS

CROSS-REFERENCE TO RELATED APPLICATIONS

Not Applicable—New non-provisional application none preceding on subject.

FEDERALLY SPONSORED RESEARCH

Not Applicable

JOINT RESEARCH PARTIES

Not Applicable

REFERENCE TO A "SEQUENCE LISTING", A TABLE, ETC.

Not Applicable

BACKGROUND OF THE INVENTION

1. Field of the Invention

Broadly, the field is external heat engines, which can also be redesigned and used as heat pumps. Within this category the field is external heat engines or heat pumps comprising what might be described as a part of a centrifugal fan acting as a compressor and a second centrifugal fan operated backwards and acting as an expander. When I say fan I am actually talking about a compressor or an expander. The fan part differs from conventional centrifugal fans, because the output is directed with a substantial axial component as opposed to almost entirely tangential output for a standard centrifugal fan. The engine fans also differ from conventional fans in that when the engine is idling, the output of the fan may be zero. There is an unstable equilibrium when the fluid is merely rotating with the engine as a whole. The engine power output is associated with the circulation of the working fluid relative to the rotating engine and the velocity changes producing pressure and temperature changes due to that circulation and rotation. The rotation of the engine amplifies the effects of the circulation.

2. Description of Related Art

There are many external heat engines that expand and contract a working fluid. One of my favorites is the Stirling engine which uses a large piston to oscillate the fluid between being cooled and being heated. The oscillation is caused by sending it through a regenerator and having a heat source on one side and a cooling source on the other side of the regenerator. The power output piston is synchronized out of phase with the oscillator piston. There is friction and pressure loss at both pistons. My invention requires no piston and no chamber that changes volume. Also no regenerator, which causes power loss, is necessary.

Other engines use a compressor followed by an expander. The closest to my invention use centrifugal compressors, similar to axial compressors that push the fluid along the rotation axis of an impeller. A jet engine for example is an internal combustion engine that can use a compressor up front. Parts of the compressor move with respect to other parts of the compressor. This produces energy loss even when the engine is only idling. It also may produce loss of the working fluid. It may also cause problems when the blades move faster than the speed of sound with respect to the casing in which they reside.

My invention has essentially no working fluid loss. It also has essentially no energy loss when idling, since there are no parts moving with respect to each other, except at the rotating axle. Even the working fluid is almost not moving with respect to its container. Even when the engine is going at full speed, the only sound speed problems would be between the rotating casing and a surrounding container. When idling my engine acts like the child's toy, a rotating top. Also the engine has no moving seals contacting the working fluid, thus requiring no lubrication. The engine has no seals at all, except on the axle of the engine. It should last forever with no maintenance.

The most closely related art would be centrifugal compressors, since my invention combines two of these, but the output of each is not tangential and the output of one is at the fan area closest to the axis of rotation. Thus an expansion fan is operated like a compressor in reverse, receiving input far from the axis and expelling output very near the axis. To get a larger difference in pressure between the input and output of the compression fan, the spiral as it goes from the center to the outside is retrograde (counter to the rotation direction). Thus the normal to the surface that pushes the working fluid has a positive radial component. The larger the pressure ratio, the larger the temperature ratio can be and thus the larger the theoretical efficiency of the engine. The current limits of the compression ratio on centrifugal compressors is about ten to one. External heat will be added after the compression, when the fluid is substantially furthest from the axis of rotation.

Actually the engine does not use a purely centrifugal fan, because after the working fluid almost reaches the extreme distance from the rotation axis, for best efficiency, it must be expelled more nearly parallel to the rotation axis, so it can be directed to the second centrifugal fan, which will act as an expander producing power. The impellers may be partially twisted to accomplish the expulsion of the working fluid in a direction nearly parallel to the rotation axis. Also the fan compartment may be shaped so that the fluid first is traveling away from the other fan but at the time to exit the fan it is traveling more toward the other fan. Thus the fan is a cross between a radial fan and an axial fan and the fan compartment is warped to be more like the curved surface of a half of a sliced bagel ready for the spreading of cream cheese. Also each impeller may spiral further from the axis on the side closer to the other fan, thus allowing a radial component in the velocity as it leaves the fan. Of course there is a large tangential component in inertial space, but not relative to the working fluid container. In a conventional centrifugal fan the output fluid is usually expelled perpendicular to the rotation axis.

The heat cycle of the engine of this invention is as follows. The working fluid goes through compression, followed by adding heat, followed by expansion, followed by cooling, then repeat often. A cycle of the same description is used by other engines using a compressor and an expander. Ideally, the cycle is performed adiabatically (no heat added or subtracted from the working fluid), except at the extremes where heat is being added or removed.

Ideally the blades of the centrifugal fans meet the fluid so that the fluid is traveling in a direction parallel to the blade surface just before contact and just after leaving each blade. Each blade may be replaced by several blades at varying distances from the axis. Ideally, for maximum efficiency the pressure difference in each fan is maximized producing the largest temperature ratio possible. The extreme pressure ratio on centrifugal compressors is currently about 10:1. At ratios above ten the compressor may wear out fast and may be dangerous. A ratio of 5:1 would be adequate for very good efficiency and reduced risk and reduced energy loss within the engine. Other reasons to reduce the pressure ratio will be discussed later.

One object of the current invention was to produce an engine/heat pump which, when operating at a steady speed, has no changes in temperature at any particular point. Thus heat loss due to changing operating temperatures at a particular position are negligible. Heat loss due to conduction along the parts with spatial temperature differences can be minimized in several ways. Heat transfer by conduction along the blades could be minimized by using ceramic blades, or by replacing long blades with a series of blades occurring at varying distances from the rotation axis. Heat transfer in the area between the hot and cold heat exchangers can be minimized by using ceramic or by using insulating lining on the parts closer to the axis of rotation (the cold heat exchanger area) where centrifugal forces are lower. The insulating lining would be forced toward the body being lined by centrifugal forces. Any insulating layer would not be subject to friction wear, since neither the fan blades nor any other parts of the engine touching the working fluid move relative to each other, except for minor adjustments of the blade angle with respect to fluid flow.

Another object was to produce an engine where there is essentially no loss of pressure around pistons or blades. Prior engines would produce localized circulations and turbulence especially where the blades are close to the blade casing. There is rapid relative motion between closely spaced components in most prior art. In my invention the casing which is touched by the working fluid moves with the same rotation rate as the blades, so the blades do not move with respect to the casing, except for angle adjustments.

Another object of the current invention is to produce an engine comprising a centrifugal compressor and a reverse operated compressor in which the working fluid speeds above Mach 1.3 in the compressor are not a problem, because that speed is actually only relative to the outside of the engine. The speed of the working fluid relative to the blades and to the casing used to contain the working fluid is much smaller. The only high relative speeds are between the working fluid container and the flow container for the external fluid in the hot flow heat exchanger. The fluid between the two fast moving surfaces will be near atmospheric pressure and will take on the average speed, being much lower than Mach 1.3. If the heat input is concentrated sunlight, then there does not need to be a flow container for the external fluid although a glass container might be used to prevent heat loss to the atmosphere. The light could be directed onto the working fluid container.

Another object of the invention was to produce an engine with negligible friction loss, since there are no solid parts moving relative to each other due to the engine cycle. Of course, as with most engines, the output shaft is rotating with respect to the device propelled by the engine.

Another object of the invention was to produce an engine that would have no loss of working fluid to the outside or around pistons, since substantially the working fluid is in a container that does not necessarily change shape or volume, except for stress or strain. Argon gas would not permeate or escape from its enclosure if steel is used.

Another object is to produce an engine wherein the working fluid can be at a much higher pressure internally, where the relative motion with respect to the container is small, and wherein the relative motion of the container with respect to the atmosphere can be much larger.

Another object of the current invention was to produce an engine which produces very little metal fatigue, since the parts do not move relative to each other during operation.

BRIEF SUMMARY OF THE INVENTION

The invention is an external heat engine, which can be modified to serve as a heat pump. The engine rotates around an axis and the working fluid also rotates around this axis with substantially the same rotation rate. While rotating around this axis, a motion as follows is superimposed on the fluid. The fluid travels substantially along the axis, near the center of rotation and is cooled by a fluid in a central pipe during this travel. It has been traveling away from what might be described as a first modified centrifugal fan. It enters what might be described as a second modified centrifugal fan. The fluid is compressed by this second fan and expelled at the periphery of this second fan with the superimposed motion (motion relative to the working fluid container) traveling somewhat radially and somewhat along the axis of rotation, but back toward the first fan. The fluid has been heated by compression and further heat is added before the fluid then enters near the periphery of the first fan. The fluid is expanded in this first fan and thus produces torque tending to accelerate the rotation. The fluid leaves this first fan near its center but traveling toward the second fan.

The blades of the two fans are attached to the walls of the working fluid container, but the attachment, in some models of the invention, may allow rotation with respect to the other rotating parts of the engine around axes substantially parallel to the main rotation axis of the engine. This allows the blades to meet and to release the working fluid at a controlled variable angle. Rotated blades allow the engine to compensate for the effects of differing speeds by adjusting blade angle so that the fluid always meets each blade substantially parallel to the blade surface. Also, the effects of acceleration and deceleration on flow of the working fluid can be smoothed out by changing blade angle. If blades located at various distances from the rotation axis are used, then the blades further from the axis in the compressor may urge the fluid with a significant axial component toward the expander fan.

The power output of the engine is the net difference between the power input to the compressor and the power output from the expander. Since the fluid is further heated and thus expanded after compression, it is traveling at a faster volume flow rate into the expander than it was flowing leaving the compressor. This allows it to do more work in the expander than was used in the compressor. Principals of compressor design including expansion of fluid path cross-section to increase pressure difference at the expense of speed apply somewhat. The fluid pressure change rather than flow rate is emphasized at the output from the compressor.

When the engine is started and as rotation speed builds, the fluid, due to its inertia, pushes against the blades. The compressor blades help the fluid to take up the relative motion being superimposed on top of the rotation. This relative motion can be helped by a slight bias of blade direction. Assume that the blades of the compressor spiral in the opposite direction from the rotation. Then there will be a radially outward component to the force produced by the blades on the working fluid when the engine is accelerating. Similarly, assume that the blades on the expander spiral forward in the direction of rotation. Then there will be a radially inward component of the force produced by the blades of the expander on the working fluid due to engine acceleration. The outward forces on the fluid in the compressor and the inward forces on the fluid in the expander both produce circulation of the working fluid in the same sense (outward in the compressor and inward in the expander).

In the previous paragraph only the effects of rotational acceleration were taken into account. Now consider the effects of the fluid circulation combined with the engine rotation. The fluid circulation changes the radial distance of the fluid from the rotation axis in both the expander and the compressor. Assuming the same spirals of the blades as in the immediately preceding paragraph, and assuming engine rotation without acceleration, then in the compressor the blades always are moving faster than the fluid, because the fluid is moving radially outward to where the blades are moving faster. Thus there will be an outward component of force on the fluid due to the blades. There is also the centrifugal force. These two forces add to produce a large pressure change as the fluid moves radially outward through the compressor. In the expander the blades will be moving slower than the fluid as it moves inward to positions where the blades are moving slower than the blade surfaces just left by the fluid. This means that the blade surfaces being hit by the fluid are pointing radially outward, similarly to what happens when the engine decelerates. Thus the blades push the fluid radially outward and add to the centrifugal force which is also pointing radially outward. Thus the pressure ratio from center to outside is increased in the expander. To maintain circulation while the engine is not changing speed it is important to make the pressure changes favoring circulation slightly larger than those opposing circulation.

If the expander blade spiral is negligible meaning that the blades are almost flat, whereas the compressor blades are spiraled, then the compressor will dominate and maintain the circulation. The compressor will also start the circulation when the engine is accelerated. From a circulation point of view during steady engine output and during acceleration and deceleration it is best to use very little spiral in the expander and compressor. A balance must be struck between increasing engine efficiency by causing larger pressure ratios by spiraling blades and increasing engine stability by using mainly centrifugal forces to produce the large pressure ratios. For some applications engine speed will not vary much and more pronounced spirals can be used.

Special blades, which can double as heat exchange fins, can be located within the path from the compressor to the expander to impel the fluid forward when the rotation rate of the fluid must be increased to match the rotation rate of the engine at the entrance to the expander. It may be hard to tell where the compressor blades leave off and the blades along the path to the expander begin. The object is to produce as smooth a flow as possible as the fluid is sent through its cycle and still get a large energy output. Once the relative motion starts, the difference in velocity of points rotating exactly with the engine rotation but further from or nearer to the rotation axis, at various points along the fluid path causes the fluid to push against the blades. This not only tends to increase the flow of the working fluid, but also produces engine output torque.

If the engine which is the subject of this invention is added to and is using the heat output of a first engine, such as a car engine, the engine will probably reduce speed at times as well as increase speed at other times. When the engine rotation speed is reduced, then the working fluid net velocity at a particular point (that velocity which is measured by velocity with respect to the velocity at that point of the engine due to engine rotation around the axis) will tend to reverse direction, thus reversing flow. This happens because the difference between compressor effects and the expander effects which tends to keep the flow going when engine speed is constant, may be overcome by the engine rotation deceleration effects. The fluid may be hitting the opposite side of the blades in the compressor. Thus the normal to the surface being hit by the working fluid may now be inward rather than outward, thus producing forces on the fluid opposing the centrifugal forces. During deceleration the fluid hits the blades of the expander harder and thus causes increased resistance to the cycling flow.

This tendency to reverse flow can be countered in many ways. The blades can have a variable pitch with respect to the radial direction. This could be accomplished in many ways, one of which would be to include tiny electrical motors at the edge of the working fluid space to rotate the blades. A single spiral might comprise many blades, though it is not necessary to have the blades along spirals.

Another way to counter the tendency to reverse fluid flow would be to use an external coupling that would not require the engine to slow quickly. This coupling could work with a rotation sensor using a feedback loop. Feedback loops are common in engineering and the stealth bombers would not fly without such a loop to maintain aerodynamic stability. When the engine slowing is detected the coupling to the load would be reduced, thus reducing the engine slowing to a rate that would allow the working fluid to maintain its superimposed flow. If a car were braking, then the coupling would be reduced to almost zero. In a car there would probably be a fluid power coupling anyway. The old method to let the engine idle while the car was not moving was a clutch. The car engine can act like a starter for the engine of this invention. Of course the engine of this invention can work without another engine, but like most engines it needs a starter. A feedback loop for engine slow down is also recommended for most applications. Also means to divert the input heat when engine slowdown is desired would be useful.

Assuming that during optimum performance speeds the temperature at the upper end heat exchanger does not reduce much, say a hundred degrees, then it might be advisable to put a second engine of similar design down stream from the heat source. This would allow the unused upper temperature heat discarded by the first engine of this invention to be used by a second engine of this invention. There may be a series of engines each rotating around the same axis if desired.

Of course unused heat can be routed back to the heat source to improve efficiency of the heat source. This might be used in a solar collector. If the heat were transferred by a fluid flowing in the collector, then the flow from the engine would be introduced at the cooler end of the collector flow. If the heat source were a light concentrator not using fluid flow, then the heat at the engine heat exchanger may be directly applied to the working fluid container and the unused heat would remain on the skin of the container, thus requiring less sunlight to bring the temperature back up to optimum. Very high efficiency could be attained.

Heat Pump Aspect

It may be easier to understand how the device works as a heat pump, since there is no extremely variable load. Suppose we have a drum of a compressible fluid rotating. If we now cause fluid to migrate from the center to the periphery of the drum, as would happen in the compressor fan, this fluid will compress thus raising its temperature. If the fluid is now sent back toward the center of rotation, as would happen in the expander fan, the fluid will expand thus cooling. Thus we have a difference between the temperature at the periphery and the temperature near the center of rotation. This temperature difference can be used, assuming heat exchange, as in a heat pump and energy must be added to continue the rotation. The rotation energy must be added, because the fluid is traveling with higher volume flow at the same distance from the rotation axis in the compressor than in the expander, thus making the energy used in the compressor greater than the energy recovered in the expander. As an aside, the opposite was true of the engine. In a heat pump, heat is added after expansion but before compression, because that is how a heat pump works at the cool end. Similarly heat is removed at the warm periphery, just before expansion. The addition and removal of heat affects the volume flow not the mass flow. Volume flow affects fluid speed and thus its momentum change and thus pressure on the blades.

Pressure and Rotation G Force Considerations

The engine or heat pump can be operated with the working fluid held at many atmospheres. It can also be operated at very large rotational G forces. If the compressor is operated near a 7:1 pressure ratio, a large part of that ratio is caused by G forces. Another large part of the pressure ratio is due to the blades pushing the fluid with a radial component. The pushing is caused by inertial effects as the blade tries to increase or decrease the angular momentum of the fluid in the compressor or expander respectively. Most pressure differences are against concave surfaces, which are stable. With proper design, the only pressure difference against an unreinforced convex surface, being therefore unstable, is at a pipe going through the center of the engine parallel to the axis.

The space between the connection where heat is being added and the connection where heat is being removed should ideally be filled with a solid or a reinforced body. Since the working fluid may be at hundreds of atmospheres and the pressure ratio from the inner to the outer points may be very large, the borders of the space may need reinforcing like that used in submarines. This space, since it does not need working fluid, should contain a strong material to keep the shape of the space uniform and prevent much working fluid from being wasted in the space. This material can reinforce an impervious wall around the space if desired and can be porous. If desired, the material in this space can be solid and act like a fly-wheel.

A lot of work has been done on the design of centrifuges and energy storing fly-wheels. The safety limits for centrifuges and fly-wheels should be taken into account. Also the engineering aspects of bearings and other critical parts for centrifuges and fly-wheel energy storage systems would be useful knowledge. Also centrifugal compressor design may be useful, even though they have stationary casing design around the blades, whereas the casing for the blades rotates with the blades in the present invention. Also it is more important in the current invention to not have casing parts extending far off the rotation axis, because they are rotating and would have stress proportional to the square of the radius from the rotation axis.

DETAILED DESCRIPTION OF THE INVENTION

Figure 1:
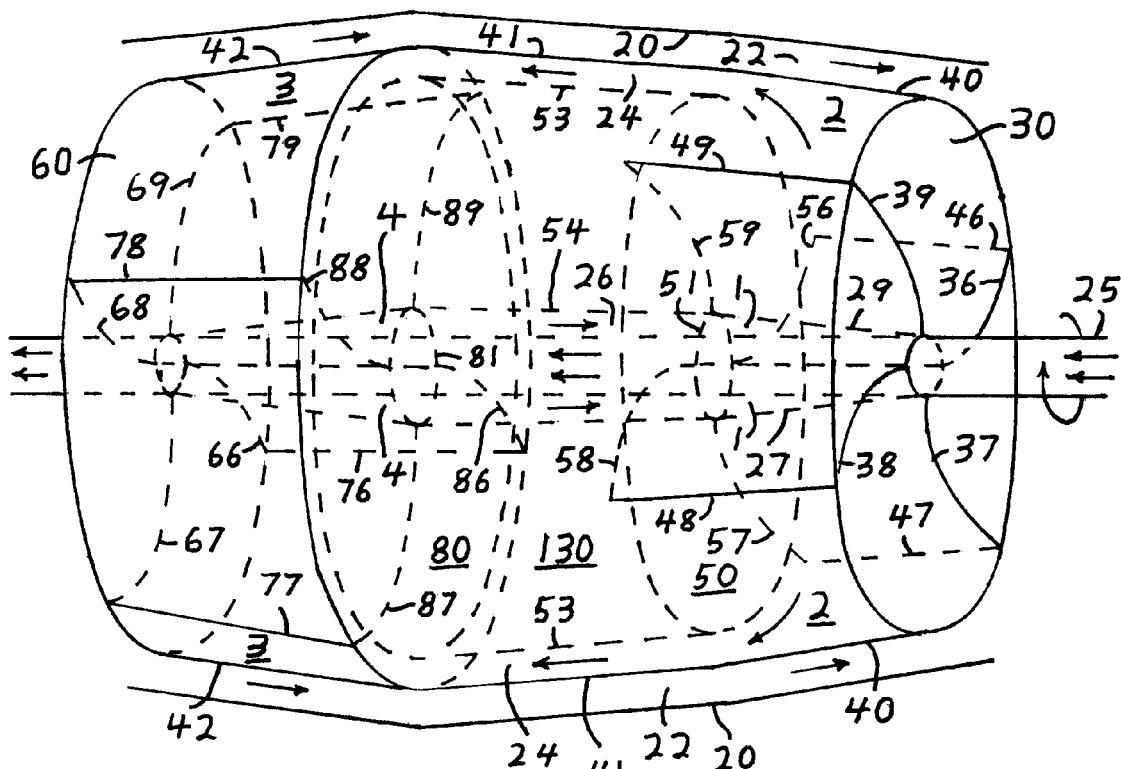
FIG. 1 shows a perspective view of a complete engine except that the heat exchangers are not shown in detail, the feedback system keyed on engine rotation is not shown, and the fluid flow is not optimized by for example adding curvature to the blade casings, thus avoiding some confusing curved lines. The figure shows two centrifugal fans and the fluid path connections between them. Also not shown are the fins or spirals connecting the outer and inner wall of the path on which heat is added. Also, the outer container, which does not rotate, and merely contains the heating fluid, is drawn transparent to avoid confusion. Otherwise all of the lines of the rotating parts of the engine would be dotted, not solid.

FIG. 1 shows a workable, but simplified version of the engine. Numbers 1, 2, 3, and 4 are reserved for points in the flow of the working fluid that illustrate the cycle through which the working fluid goes. Except for the containment sheet 20 on the top and bottom of the figure and used to direct a hot fluid in the channel labeled 22 between containment sheet 20 and sheet 41, all parts in the figure are rotating with a common angular velocity around the axis of the pipe 25 used to carry a cooling fluid, probably a high heat capacity liquid. The pipe 25 also carries the output torque of the engine.

The fairly thick metal sheet 30, which serves to hold in the working fluid, would best be concave when looked at from within the engine, near its center. Curved lines 36, 37, 38, and 39 represent the intersection of fan blades with sheet 30 and would best represent a firm attachment. The curved lines and thus the blades form a spiral but the spiral, for the sake of clarity in the drawing, does not go more than 90 degrees around the axis of rotation. Otherwise the spirals would be too close to each other and cause confusion. In actual practice the spirals might wrap much further around the axis of rotation to increase pressure at the pump output.

Lines 46, 47, 48, and 49 represent the intersection of the working fluid container, a part of which is represented by the sheet 40, with the same respective fan blades and would best represent a firm attachment along those lines. Lines 56, 57, 58, and 59 represent the intersection of the respective blades with a disc 50, which is the surface of solid 130 and may be slightly convex when viewed from sheet 30. The convex shape would help direct output fluid from one fan to the other. The optimum shape for surface 50 and surface 30 will be discussed later. The blades can be firmly attached to the solid 130 at disc 50.

The disc stops short of the extremes of the blades, because fluid has to leave the fan area and proceed to the second fan along the channel 24 between surface 53 and the surface of sheet 41. Neither surface needs to be exactly conical and either or both may bulge somewhat. Heat is exchanged across sheet 41. The exchange is between hot fluid in channel 22 and hot working fluid in channel 24. In an engine heat is added to the working fluid. The working fluid was heated by the compression due to centrifugal force and due to the fan blades. The disc 50 has a hole in the center. The perimeter of the hole is numbered 51. This hole allows fluid coming from the other fan to enter the area occupied by the fan blades just described.

Surface 54, which may be part of the surface of solid 130 forming an inner bore, and the outside of pipe 25 form a channel 26 which conducts fluid from a second fan to the fan already described. The cool fluid in the pipe 25 exchanges heat with the cool fluid traveling between the fans in channel 26. The working fluid is cooler near the axis of rotation than it is near the periphery of the engine because the fluid has been expanded in the second fan area and not been compressed yet in the first fan area. In an engine heat is removed from the working fluid in channel 26. In a heat pump heat would be added to the working fluid in channel 26.

Before describing the second fan, line 27 represents the fourth edge of the blade whose other three edges are 37, 47, and 57. Similarly line 29 represents the fourth edge of the blade whose other three edges are 39, 49, and 59. The fourth edges of the other two blades of the first fan are similar but their lines on the drawing both coincide in a two dimensional view with the line that would describe the axis of rotation. They are shown by dotted lines.

The second fan is similar to the first. The sheet 60, which serves to hold in the working fluid, would best be concave when looked at from within the engine near its center. Curved lines 66, 67, 68, and 69 represent the intersection of fan blades with sheet 60 and would best represent a firm attachment. The curved lines and thus the blades form a spiral, but, for the sake of clarity in the drawing, the spirals do not go more than 90 degrees around the axis of rotation. Otherwise the spirals would be too close to each other and cause confusion. In actual practice the spirals might wrap much further around the axis of rotation to decrease pressure at the pump output near its center.

Lines 76, 77, 78, and 79 represent the intersection of the working fluid container, a part of which is represented by sheet 42, with the same respective fan blades and would best represent a firm attachment along those lines. Lines 86, 87, 88, and 89 represent the intersection of a disc 80, which is a surface of solid 130, with the same respective fan blades. The blades can be firmly attached to the disc. The disc stops short of the extremes of the blades, because fluid has to enter the fan area having proceeded from the first fan along the channel 24 between surface 53 of the solid 130 and outer sheet 41.

Disc 80 may be concave when looked at from inside solid 130 so that working fluid traveling into the fan may make a smoother transition in velocity. The optimum shape for surface 80 and surface 60 will be discussed later.

Figure 3:
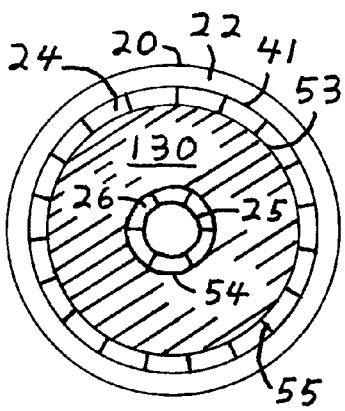
FIG. 3 shows a cross-section near the middle of the engine of FIG. 1 perpendicular to the engine rotation axis and between the two fans and viewed looking away from the compression fan.

There would be fins attached to pipe 25 and surface 54 of solid 130 to hold them so they do not move much relative to each other and also to facilitate heat exchange between the fluid in the pipe 25 and the fluid in the channel 26. These fins are not shown in FIG. 1 to prevent a clutter of lines. However they are shown in FIG. 3. There may also be heat exchange fins in the pipe 25.

There would also be fins 55 in channel 24 to facilitate heat exchange between fluid in channel 24 and fluid in channel 22. These fins are not shown in FIG. 1 to prevent clutter in the drawing and confusion. However they are shown in FIG. 3. The fins 55 could double as blades in channel 24 to meet the fluid coming from the first fan near disc 50 and bring the fluid up to the correct rotational speed while also propelling it toward the second fan. If the blades of the fan are twisted properly, the fluid may leave at close to the correct rotational rate and also traveling with a component of velocity toward the second fan.

The space between disc 80, disc 50 and surface 53 and surface 54, which I described as solid 130, may be made of solid material, so as to withstand the huge crushing pressure and also the huge pressure difference as you move radially along its surface. It may also be porous with a solid skin. The material occupying this volume must also be attached to the rest of the rotating parts of the engine so as to maintain rotation and more importantly so as to not have its center of gravity move away from the rotation axis. Attachments of itself to the sheet 41 and to pipe 25, which were discussed earlier as fins, are important in maintaining spacing and relative position. The attachments have been described above as fins in channel 24 and in channel 26.

Except for the presence of blades and fins, the points in the flow having a given axial and radial coordinate pair are equivalent independent of the amount of rotation. In FIG. 1, I have marked two equivalent positions in the flow for each of the following four points. In a typical cycle, the working fluid could be made to go from point 1 near the axis of rotation to point 2 thus compressing the fluid and heating it. The fluid could then travel along channel 24 while heat is added to it by heat exchange with the fluid in channel 22. The fluid arrives at point 3 heated and then travels through the expander to point 4. It expands cools and provides mechanical energy to the blades while in the expander. It then travels along channel 26 back to a point similar to point 1 while being cooled by heat exchange with the fluid in pipe 25.

This cycle could be caused to happen in ways other than using a fan compressor and a fan expander. Consider a metal tube accompanied by proper structural supports, and shaped and rotated and heated and cooled as needed to carry a fluid along the actual physical and temperature path of the working fluid as described in the preceding paragraph. This contraption would act like an engine. The energy loss in the engine would be mainly from the pressure drop due to fluid flow within the tube. The biggest problem would be how to add heat at the points furthest from the rotation axis, and how to remove heat at the points closest to the rotation axis.

As a matter of fact, in the engine shown in FIG. 1, the paths between the fans are topologically equivalent to tubes, and each fan is topologically equivalent to a set of parallel tubes.

Figure 2:
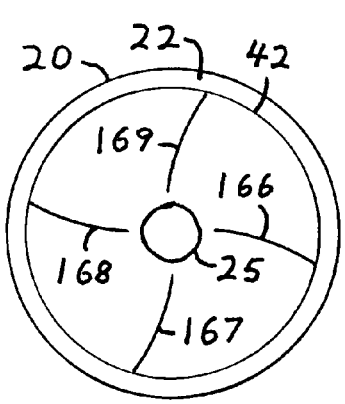
FIG. 2 shows a cross-section near the left end of the engine of FIG. 1 perpendicular to the engine axis and through the center of gravity of the expansion fan and viewed looking away from the compression fan.

FIG. 2 shows a cross-section of the expander shown in FIG. 1, perpendicular to the rotation axis and through the center of gravity of the expander and viewed looking toward container sheet 60 and away from container sheet 30. The blades 166, 167, 168, and 169, whose respective connections with container part 60 were labeled in FIG. 1 as 66, 67, 68, and 69, are shown as stopping short of pipe 25. They can actually continue to the pipe if desired. There would be some heat loss traveling along the blades to or from the pipe. Sheet 42 is an outer part of the working fluid container and the blades are shown connected to it. Heat loss along the blades fed by heated sheet 42 will add some to energy output, but not efficiency. Channel 22 carries the fluid providing input heat to the engine. It is bounded on the outside with containment sheet 20, which does not rotate with the rest of the engine.

FIG. 3 shows the fluid paths between the inputs and outputs of the two fans shown in FIG. 1. It is a cross-section of the engine of FIG. 1 taken perpendicular to the rotation axis and substantially equidistant between the two fans and viewed looking toward container sheet 60 and away from container sheet 30. Pipe 25 in the center is a continuation of itself also shown in FIGS. 2 and 4 and in FIG. 1. It supports the engine physically and carries the output engine torque to the user of the engine. It also carries the cooling fluid, probably a liquid. Channel 26 carries working fluid between the two fans. Since it touches pipe 25 the fluid gives up heat to the pipe, while the fluid travels between the fans. Surface 54 of solid 130 is an outer boundary of channel 26 and is also the innermost boundary of solid 130 whose outermost boundary is surface 53. There should be braces or some means to carry torque between the pipe 25 and solid 130 and those braces can also act as heat exchange fins connected to the pipe for good heat transfer. These braces doubling as fins were also mentioned in the discussion of FIG. 1. They are shown in FIG. 3 but not in FIG. 1, because they would add to the clutter of lines at the center of FIG. 1.

Channel 24 carries working fluid from one fan to the other. It is bounded by surface 53 of solid 130 and by sheet 41. Fins 55 which also act as braces and blades are located in channel 24. As fins they aid heat exchange between the fluid in channel 22 and the working fluid in channel 24. As braces they minimize relative motion between sheet 41 and solid 130. As blades they urge the working fluid to travel from the compressor fan to the expander fan. They simultaneously increase the angular momentum of the working fluid. Containment sheet 20 forms an outer boundary for fluid flowing in channel 22. Containment sheet 20 also serves as a shield in case the engine explodes. The engine should be kept at a safe operating speed. Since there is almost no bending or changing stress on engine parts during operation they should have little metal fatigue.

Figure 4:
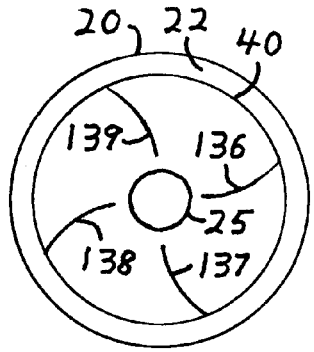
FIG. 4 shows a cross-section near the right end of the engine of FIG. 1 perpendicular to the engine axis and through the center of gravity of the compression fan and viewed looking toward the expansion fan.

FIG. 4 shows a cross-section of the compressor shown in FIG. 1, perpendicular to the rotation axis and through the center of gravity of the compressor and viewed looking toward container sheet 60 and away from container sheet 30. The blades 136, 137, 138, and 139, whose respective connections with container sheet 30 were labeled in FIG. 1 as 36, 37, 38, and 39, are shown as stopping short of pipe 25. They can actually continue to the pipe if desired. There would be some heat loss traveling along the blades to or from the pipe. Sheet 40 is an outer part of the working fluid container and the blades are shown connected to it. Heat loss along the blades from heated sheet 40 will add some to energy output, but not efficiency. Channel 22 carries the fluid providing input heat to the engine. It is bounded on the outside with containment sheet 20, which does not rotate with the rest of the engine.

The engine can be manufactured in many ways and this would be left to the engineers. One way that appears good to me is to construct the two halves of the engine separately. Divide the engine into two parts to be connected later at the cross-section shown in FIG. 3. When cut in this way all of the metal parts are accessible from this cut. Also all of the spaces to be occupied by the working fluid are accessible from this cut. This would allow casting, if the pouring is done in a vacuum.

If most of the parts are not cast as a single unit, then it is best to leave sheet 40 off, as a path for the welder, until the blades are attached to sheet 30 and surface 50 of solid 130. It would also be best to leave sheet 42 off until the other set of blades is attached to sheet 60 and surface 80 of solid 130. In each case the welder could be inserted through the eventual location of sheet 40 and sheet 42. This manufacturing technique would imply that solid 130 would consist of two parts one on each side of the cross-section shown in FIG. 3. Any working fluid that eventually seeps between the two halves of solid 130 would cause no serious problem.

As the engine is drawn, the torque on pipe 25 due to fluid reaction in the compressor when viewed from the extreme right of the figure is counter-clockwise. The torque on pipe 25 due to fluid impelling the blades in the expander when viewed from the far left is also counter-clockwise. Thus the two sections of pipe meeting at FIG. 3 could screw together so that those torques would tend to screw it tighter. The threads would be counter to the normal threading (which assumes that both parts are coming in clockwise looking toward the junction). If the drawing had been reversed, so the expander and compressor interchange positions while keeping the rotation the same, or if the blade spirals and rotation were reversed, then the screws should have normal threading, tightening clockwise. An arc welder or maybe a laser welder using a light pipe could be inserted along the inside of the pipe and thus the two sections of pipe could be welded together.

Looking at FIG. 3 fins between the pipe and solid 130 should be attached to the pipe producing good heat transfer before the solid 130 is added. Welding of fins in channel 26 to solid 130 could take place using a welder inserted parallel to the rotation axis. For good heat transfer, fins 55 shown in FIG. 3 should be attached to sheet 41 before it is placed around solid 130 and those fins should be welded to solid 130 afterward. Again, the welder could be inserted into channel 24 parallel to the rotation axis from the cut made by the cross-section of FIG. 3. Any fins that would extend into channel 22 could be attached to sheet 41 before or after placing it around solid 130. Since the blade casings sheet 40 and sheet 42 extend further from the rotation axis than solid 130 does, in each case there is room between the casing and the solid 130 to insert a welder to weld the blades to the sheets 40 and 42 as long as sheet 41 is attached later. None of the above is to imply that other forms of welding or of connecting parts or of casting could not be used to build the engine. Also, there is no order in which the operations must be done.

In order to put working fluid into the engine after construction, while a valve could be attached near the axis on sheet 30 it might be best to simply use two access ports located on opposite sides of the rotation axis. The engine would be placed in a pressurized chamber containing the working fluid to be added to the engine. These access ports can be permanently sealed after the working fluid is injected, since no fluid is likely to leak after the ports are closed.

The use of two ports brings up the fact that because of the high rotation rates there should be balancing, so the engine does not vibrate. Any valve or port, preferably placed near the axis of rotation, must be accompanied by opposing balancing weight. The engine as a whole should be put on a balancer and weights should be added to balance as necessary. Maybe a fake weld can be added to the outside.

To optimize flow and thus minimize loss associated with localized circulations and turbulence, there should be a relatively smooth transition of the axial component of relative velocity of the flow as it enters, travels through, and leaves each fan. Consider a plot of the position of a small volume of working fluid, to be referred to within this paragraph as "the position", as the small volume of working fluid travels through the engine. Use the component of the position parallel to the rotation axis as the X coordinate and use the distance of the position from the axis as the Y coordinate. We are ignoring the rotational angle around the axis. As the position travels along channel 26 the fluid is cooled and has a large and slowly varying velocity in the +X direction. When it leaves the vicinity of the center hole of disc 50, a surface of solid 130, it starts into the compressor. While in the compressor the velocity of the position gradually decreases in the +X direction but increases in the +Y direction. To facilitate this rotation in direction, a tangent to the surface of solid 130 nearest the position can be almost parallel to the velocity of the position of the small volume of working fluid. This tangent starts out nearly parallel to the rotation axis. Somewhere near the middle of the compressor, the velocity of the position is nearly all in the +Y direction. Thus, in a plane containing the axis of rotation, the direction of the surface of solid 130 near the middle of the compressor should therefore be in the +Y direction, equivalently perpendicular to the rotation axis. Shortly after leaving the compressor and entering channel 24 near the periphery of disk 50, the position is traveling in the −X direction. Thus to follow the position, the tangent to the surface of the solid 130 will have rotated smoothly to follow the velocity of the position. The net result is that the surface of solid 130 looks similar to a semi-circle in the (X,Y) coordinate system.

Actually, since the position can have only positive Y components, the real three dimensional surface of solid 130 must be found by rotating the surface curve obtained in the (X,Y) coordinate system around the rotation axis, thus producing a surface for solid 130 looking like the surface of a half bagel obtained by slicing through the bagel's center perpendicular to the axis of rotational symmetry.

This configuration and a similar configuration for sheet 30 would produce relatively smooth flow, but sheet 30 would have to be anchored extremely well to the pipe 25 and to the blades or it would need reinforcement to overcome the extreme pressure forces due to pressure of the working fluid. Also a compromise has to be made to get good pumping efficiency, since the pump works best in a region in which the blades are pushing the fluid with a large radial component. The radial component is reduced when the fluid is traveling with a large X component in its velocity.

Correctly shaped and oriented blades can continue to increase pressure of the working fluid, even when the velocity has lost most of its Y component. The fan behaves somewhat like an axial compressor when the Y component is very small. The radial compressor aspect has a huge advantage over the axial compressor aspect, since the radial is helped by the very large rotational speed of the engine. Even at low working fluid flow rates, there is a huge contribution to pressure differences made by the centrifugal forces. Because surfaces 50 and 80 and surfaces 30 and 60 are shown as flat in FIG. 1, this emphasizes the radial pumping aspect at the expense of the smooth flow aspect of the engine. Some compromise must be made. The flat surfaces also made the description of the figure much easier to follow.

When looking at operating temperatures in designing for efficiency, the following must be taken into account. The output of the engine, minus losses, is the difference between output energy of the expander and that energy needed to compress the fluid. For small differences this difference will grow proportionally to the temperature difference induced in the working fluid along channel 24, in other words along the high temperature heat exchanger. If we start with a given size compressor, then at low temperature difference along the heat exchanger, the corresponding expander should be of similar size and the sum of losses in the compressor and expander will be about twice the compressor loss. At first as we increase temperature difference the loss remains almost constant while the energy output increases proportionally to the temperature difference. If the temperature difference is sufficiently large (like in a jet engine or an internal combustion turbine), then the compressor loss becomes small compared with the expander loss.

Operating at the high temperature end between 900 degrees absolute and 800 degrees absolute on the Kelvin scale with a similar difference at the low temperature end, some efficiency is lost by reducing the effective input temperature to about 850 degrees absolute, while increasing the output temperature from the low temperature heat exchanger, thus reducing the theoretical maximum efficiency. Also the temperature ratios in the compressor and expander must be about 2.5 to 1. Thus the fans must work fairly hard thus producing some extra losses. If most of the compression and expansion can be done using centrifugal as opposed to pumping blade forces, then efficiency of the compressor and the expander can be very high.

The invention claimed is:

1. An external heat engine comprising
   a fluid container containing a compressible fluid,
   a means to rotate said fluid container around a rotation axis,
   a means to cause a part of said fluid to flow from a first position, called position one, in the container close to the rotation axis to a second position, called position two, in the container far from the rotation axis thus causing a compression of said part of said fluid,
   near and far being relative to a scale having a minimum distance being the distance from the axis of a point in said container closest to the rotation axis and a maximum distance being the distance from the axis of a point in said container farthest from the rotation axis,
   a means located far from the rotation axis and used to heat said part of said fluid by heat exchange with an external sink while said part of said fluid travels from position two to another position, called position three, also far from the axis,
   a means to extract energy as said part of said fluid moves from said position three, far from the axis, to a position, called position four, close to the rotation axis, with accompanying expansion of said part of said fluid,
   a means located near to the rotation axis and used to remove heat from said part of said fluid by heat exchange with another external heat sink while said part of said fluid travels from position four, near to the rotation axis, to position five also near to the rotation axis.

2. A heat pump comprising
   a fluid container containing a compressible fluid,
   a means to rotate said fluid container around a rotation axis,
   a means to cause a part of said fluid to flow from a first position, called position one, in said container close to the rotation axis to a second position, called position two, in said container far from the rotation axis thus causing a compression of said part of said fluid,
   near and far being relative to a scale having a minimum distance being the distance from the axis of a point in said container closest to the rotation axis and a maximum distance being the distance from the axis of a point in said container farthest from the rotation axis,
   a means located far from the rotation axis and used to extract heat from said part of said fluid by heat exchange with an external sink while said part of said fluid travels from position two to another position, called position three, also far from the rotation axis,
   a means to extract energy as said part of said fluid moves from said position three, far from the axis, to a position, called position four, close to the rotation axis, with accompanying expansion of said part of said fluid,
   a means located near to the rotation axis and used to add heat to said part of said fluid by heat exchange with another external heat sink while said part of said fluid travels from position four, near to the rotation axis, to position five also near to the rotation axis.

* * * * *